United States Patent
Hasegawa et al.

(10) Patent No.: US 9,272,434 B2
(45) Date of Patent: Mar. 1, 2016

(54) CUTTING APPARATUS, HOLDING MEMBER, AND CUTTING MEMBER

(71) Applicants: Katsuhisa Hasegawa, Kitanagoya (JP); Tomoyasu Niizeki, Ichinomiya (JP); Kayo Hasui, Nagoya (JP)

(72) Inventors: Katsuhisa Hasegawa, Kitanagoya (JP); Tomoyasu Niizeki, Ichinomiya (JP); Kayo Hasui, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 271 days.

(21) Appl. No.: 14/142,318

(22) Filed: Dec. 27, 2013

(65) Prior Publication Data

US 2014/0182431 A1    Jul. 3, 2014

(30) Foreign Application Priority Data

Dec. 27, 2012    (JP) ................................ 2012-286361

(51) Int. Cl.

| B26D 7/26 | (2006.01) |
|---|---|
| B26F 1/38 | (2006.01) |
| B62D 5/02 | (2006.01) |
| B26D 5/32 | (2006.01) |
| B62D 7/20 | (2006.01) |
| B26D 5/00 | (2006.01) |

(Continued)

(52) U.S. Cl.
CPC ................ B26D 7/2614 (2013.01); B26D 5/32 (2013.01); B26F 1/3813 (2013.01); B62D 5/02 (2013.01); *B26D 5/007* (2013.01); *B26D 5/083* (2013.01); *B26D 5/34* (2013.01); *B26D 2005/002* (2013.01); *B62D 7/20* (2013.01); *Y10T 83/141* (2015.04); *Y10T 83/748* (2015.04); *Y10T 83/849* (2015.04)

(58) Field of Classification Search
CPC .......... B26D 7/2614; B26D 5/02; B26D 5/32; B26D 5/34; B26D 5/007; B26D 5/083; B26D 2005/002; B26D 7/20; B26F 1/3813; Y10T 83/748; Y10T 83/141; Y10T 83/849
See application file for complete search history.

(56) References Cited

U.S. PATENT DOCUMENTS

| 6,608,618 | B2 * | 8/2003 | Wood ................... G06F 3/04886 345/169 |
|---|---|---|---|
| 7,054,708 | B1 * | 5/2006 | Aamodt ................. B26D 5/005 700/122 |

(Continued)

FOREIGN PATENT DOCUMENTS

| JP | S59-209200 A | 11/1984 |
|---|---|---|
| JP | S61-228997 A | 10/1986 |

(Continued)

*Primary Examiner* — Sean Michalski
(74) *Attorney, Agent, or Firm* — Fox Rothschild LLP (57) ABSTRACT

A cutting apparatus including a plurality of types of holding members holding a workpiece and a plurality of types of cutting members cutting the workpiece held by the holding member. Each holding member includes a sheet of base, a holding portion disposed on a surface of the base and having a holding capacity suitable for a type of the workpiece to be held, and a holding member indicator capable of distinguishing the types of holding members. Each cutting member includes a cutter having a blade configured to cut the workpiece and having a cutting capacity suitable for a type of the workpiece to be cut, a support portion supporting the cutter, and a cutter indicator provided on the plurality of types of cutting members and capable of distinguishing the types of cutting members, the cutter indicator being similar in configuration as the holding member indicator of corresponding holding member.

9 Claims, 10 Drawing Sheets

(51) Int. Cl.
*B26D 5/08* (2006.01)
*B26D 5/34* (2006.01)

(56) References Cited

U.S. PATENT DOCUMENTS

| | | | | |
|---|---|---|---|---|
| 7,899,618 | B2* | 3/2011 | Ledet | G05B 19/4207 156/355 |
| 8,051,371 | B2* | 11/2011 | Tatsumi | G06F 17/218 715/234 |
| 8,296,648 | B2* | 10/2012 | Tirrella | G06F 11/2069 715/234 |
| 8,299,387 | B2* | 10/2012 | Stahl | B23K 26/38 219/121.44 |
| 8,453,253 | B2* | 5/2013 | Strong | B26D 5/00 726/2 |
| 8,646,366 | B2* | 2/2014 | Workman | B26D 5/005 83/373 |
| 8,708,590 | B2* | 4/2014 | Johnson | B41J 11/46 101/485 |
| 8,823,807 | B2* | 9/2014 | Schinker | H04N 5/232 348/207.1 |
| 8,991,965 | B2* | 3/2015 | Wakita | B41J 11/663 347/101 |
| 9,046,888 | B2* | 6/2015 | Garaas | G05B 19/4061 |
| 9,102,073 | B2* | 8/2015 | Tokura | B26D 5/34 |
| 2003/0012454 | A1* | 1/2003 | Manico | H04N 1/3872 382/282 |
| 2003/0118229 | A1* | 6/2003 | Andrews | B23Q 15/013 382/141 |
| 2004/0101337 | A1* | 5/2004 | Woodman | B41J 3/36 400/76 |
| 2005/0186010 | A1* | 8/2005 | Shibata | B26D 7/015 400/621 |
| 2006/0101961 | A1* | 5/2006 | Etter | B23D 59/002 83/76.8 |
| 2006/0106482 | A1* | 5/2006 | Etter | B23B 25/06 700/180 |
| 2006/0117922 | A1* | 6/2006 | Causse | B26D 5/00 83/76.3 |
| 2007/0227332 | A1* | 10/2007 | Causse | B26D 7/015 83/879 |
| 2010/0006550 | A1* | 1/2010 | Haight | A61B 18/26 219/121.85 |
| 2012/0048086 | A1* | 3/2012 | Workman | B26D 5/005 83/76.3 |
| 2015/0258699 | A1* | 9/2015 | Vander Woude | B26D 5/20 83/13 |

FOREIGN PATENT DOCUMENTS

| | | |
|---|---|---|
| JP | 2005-205539 A | 8/2005 |
| JP | 2005-212050 A | 8/2005 |

* cited by examiner

CUTTING APPARATUS, HOLDING MEMBER, AND CUTTING MEMBER

CROSS-REFERENCE TO RELATED APPLICATION

This application is based upon and claims the benefit of priority from the prior Japanese Patent Application 2012-286361, filed on, Dec. 27, 2012, the entire contents of which are incorporated herein by reference.

FIELD

The present disclosure relates to a cutting apparatus that cuts a sheet of a cut object such as paper and cloth held by a holding member. The present disclosure further relates to the holding member being used with the cutting apparatus and a cutting member being attached to the cutting apparatus.

BACKGROUND

A cutting plotter is known as a cutting apparatus for cutting a workpiece such as paper and cloth into desired shapes while holding the workpiece with a holding member. These types of cutting apparatuses are provided with multiple types of cutting members in which the tips of the blades of the cutters protrude in different amounts so that workpieces coming in different thicknesses can be cut. The user is required to select the cutting member suitable for the workpiece in carrying out the cut work. The cutting members are provided with indicators to differentiate one another. Thus, the user may select the desired cutting member by distinguishing the indicators.

However, it is difficult for the user to distinguish the difference of thickness of the workpiece with eye sight when the workpiece is made of the same material and only differs from one another in thickness. Thus, there were cases where user combined workpiece with the wrong cutting member.

SUMMARY

Various exemplary embodiments of the general principles herein may provide a cutting apparatus that allows the user to readily be aware of the proper combination of the type of holding member holding the workpiece and the type of cutting member, a holding member configured to be set to such cutting apparatus, and a cutting member configured to be attached to such cutting apparatus.

In one aspect, a cutting apparatus configured to cut a sheet of workpiece into a predetermined shape is disclosed. The cutting apparatus includes a body; a plurality of types of holding members configured to be set to the body with the workpiece removably held thereby, each type of holding member including: a base being formed into a sheet as a whole, a holding portion disposed on a surface of the base and having a holding capacity suitable for a type of the workpiece to be held, and a holding member indicator capable of distinguishing the plurality of types of holding members; a plurality of types of cutting members configured to be selectively attached to the body and configured to cut the workpiece held by the holding member, each type of cutting member including: a cutter having a blade configured to cut the workpiece and having a cutting capacity suitable for a type of the workpiece to be cut, a support portion supporting the cutter, and a cutter indicator provided on the plurality of types of cutting members and capable of distinguishing the plurality of types of cutting members, the cutter indicator being similar in configuration as the holding member indicator of a corresponding holding member.

In one aspect, a holding member configured to hold a workpiece and configured to be set to a cutting apparatus having a cutting member attached thereto for cutting the workpiece is disclosed. The holding member includes a base being formed into a sheet as a whole, a holding portion disposed on a surface of the base and having a holding capacity suitable for a type of the workpiece to be held, and a holding member indicator capable of distinguishing plurality of types of holding members, the holding member indicator being the same in configuration as a cutter indicator of a corresponding cutting member.

In one aspect, a cutting member configured to cut a workpiece and configured to be attached to a cutting apparatus allowing setting of a holding member holding the workpiece is disclosed. The cutting member includes a cutter having a blade configured to cut the workpiece and having a cutting capacity suitable for a type of the workpiece to be cut, a support portion supporting the cutter, and a cutter indicator provided on the plurality of types of cutting members and capable of distinguishing the plurality of types of cutting members, the cutter indicator being similar in configuration as the holding member indicator of a corresponding holding member.

DETAILED DESCRIPTION

One embodiment of a cutting apparatus 100 and a holding member 51 is described herein with reference to the drawings. In the present embodiment, the cutting apparatus 100 cuts a workpiece 160 such as a sheet of paper or cloth into a predetermined shape by a cut head 130 provided with a cutting member 50. The cutting apparatus 100 is provided with a holding member 51 that holds the workpiece 160. As will be later described in detail, the holding member 51 holding the workpiece 160 is inserted from an insert hole 111 located at the front side of a body 110 of the cutting apparatus 100 and placed on a platen 120.

[Structure of Holding Member 51]

Referring back to FIG. 1, a description will be given on the holding member 51 for holding the sheet of workpiece 160.

Figure 1:
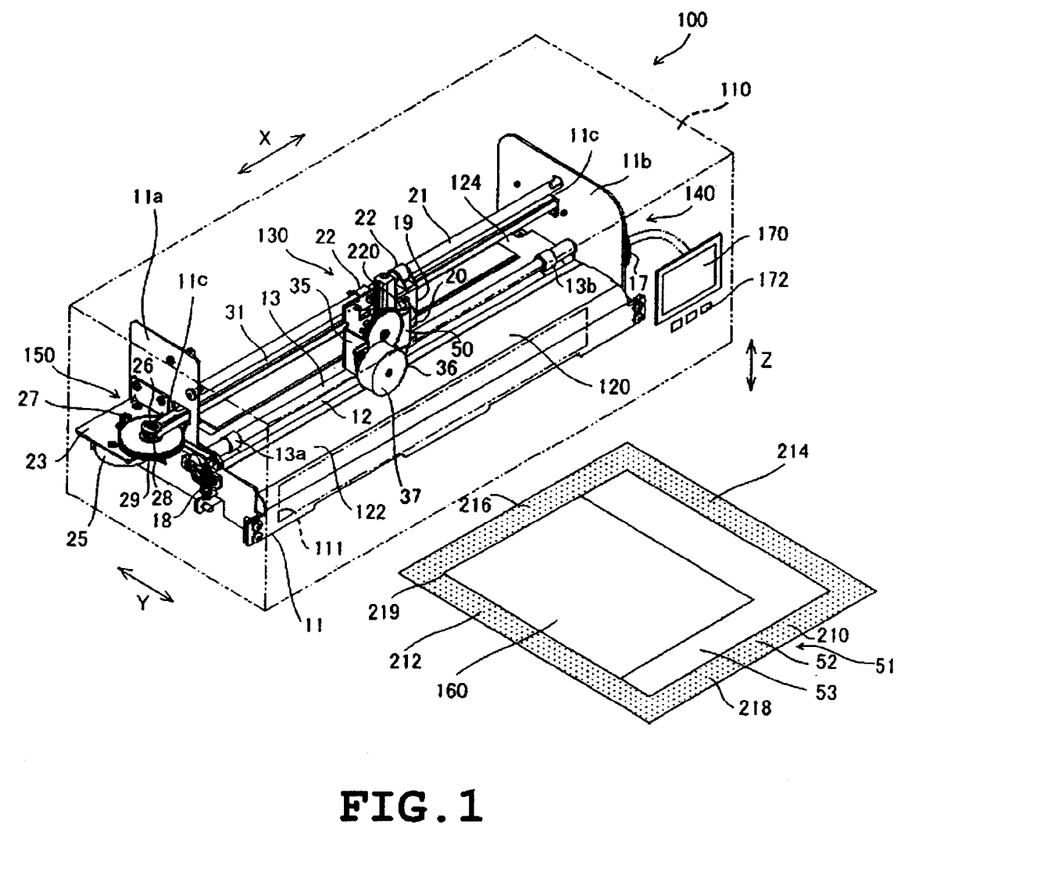
FIG. 1 pertains to a first embodiment and is one example of a perspective view illustrating the inner structure of a cutting apparatus and a holding member.

The workpiece 160 may come in different types such as paper and cloth. There are multiple types of holding members 51 for the multiple types of workpiece 160. In the present embodiment, two types of workpiece 160, namely, paper and cloth are discussed for ease of explanation.

Holding member 51 comprises a base 52, a holding portion 53, and a holding member indicator 210. The base 52 is configured as a rectangular sheet made of synthetic resin material which is slightly elongated in the front and rear direction. Though not shown, the surface of the base 52 includes a base line serving as a reference for determining the location in which the workpiece 160 is attached. The base 52 may be made of materials other than synthetic resin material such as a card board or a metal plate.

The holding portion 53 is configured by providing an adhesive layer on a rectangular area of the upper surface of the base 52 surrounded by left and right edge portions 212 and 214 and front and rear edge portions 216 and 218. The user may attach the workpiece 160 on the upper surface of the holding portion 53 to allow the workpiece 160 to be removably held in adhesive attachment. The holding capacity, in other words, the adhesive force of the holding portion 53 is controlled to a level that reliably holds the workpiece 160 unremovably during the cutting operation while allowing the workpiece 160 to peel relatively easily after the cutting operation. For instance, when the workpiece 160 is paper, the adhesive force of the holding portion 53 of the holding member 51 for holding paper is specified to a relatively weak level because the surface of paper is smooth. In contrast, when the workpiece 160 is cloth, the adhesive force of the holding portion 53 of the holding member 51 for holding cloth is specified to a relatively strong level because the surface of cloth is rough.

On the upper surface of the base 52 of the holding member 51, the holding member indicator 210 is provided for distinguishing multiple types of holding members 51. As mentioned earlier, the holding member 51 comes in a paper holding type and a cloth holding type in the present embodiment. Further, in the present embodiment, the holding member indicator 210 is configured by coloring the left and right edge portions 212 and 214 and the front and rear edge portions 216 and 218 of the upper surface of base 52, in other words, by coloring the entire peripheral portion of holding portion 53. As will be later described, the holding member indicator 210 is of the same type, in this case, is of the same color as a cutter indicator 220 provided at a predetermined cutting member 50 being associated with or corresponding to a predetermined workpiece 160.

The color of the holding member indicator 210 is preferably distinguishable by the user. In the present embodiment, cyan (bluish green) and magenta (reddish purple) are used in consideration of the following conditions (1), (2), and (3).

(1) When the color of holding member 51 is generally bright such as white, the indicator 210 is preferably colored in a dark color so as to provide good visibility to the user even when the indictor 210 is a thin line.

(2) The color of the indicator 210 is preferably compatible with the craft being created.

(3) The color of the indicator 210 is preferably distinguishable by users of color anomaly.

In view of the above described conditions, the present embodiment uses cyan for the holding member indicator 210 of the holding member 51 for holding paper and magenta for the holding member indicator 210 of the holding member 51 for holding cloth.

As will be later described, the color of the holding member indicator 210 is read by a later described scanner 180, based upon which, the type of the holding member 51 is distinguished by a control circuit 61.

The holding member 51 is assigned an X-Y coordinate system in which the origin 219 is located, for example, on the left corner of the holding portion 53. The X-Y coordinate system serves as the basis for specifying the location for cutting the workpiece 160. The X-Y coordinate system will be later described. As the holding member is used repeatedly, scratches of a later described cutter 190 gradually accumulate on the surface of the holding member 51. Further, repeated attachment and detachment of the workpiece 160 gradually reduce the adhesive force of the adhesive layer. Thus, the holding member 51 is considered as a consumable which is replaced by a new one after being used for approximately ten times.

[Structure of Cutting Apparatus 100]

Figure 2:
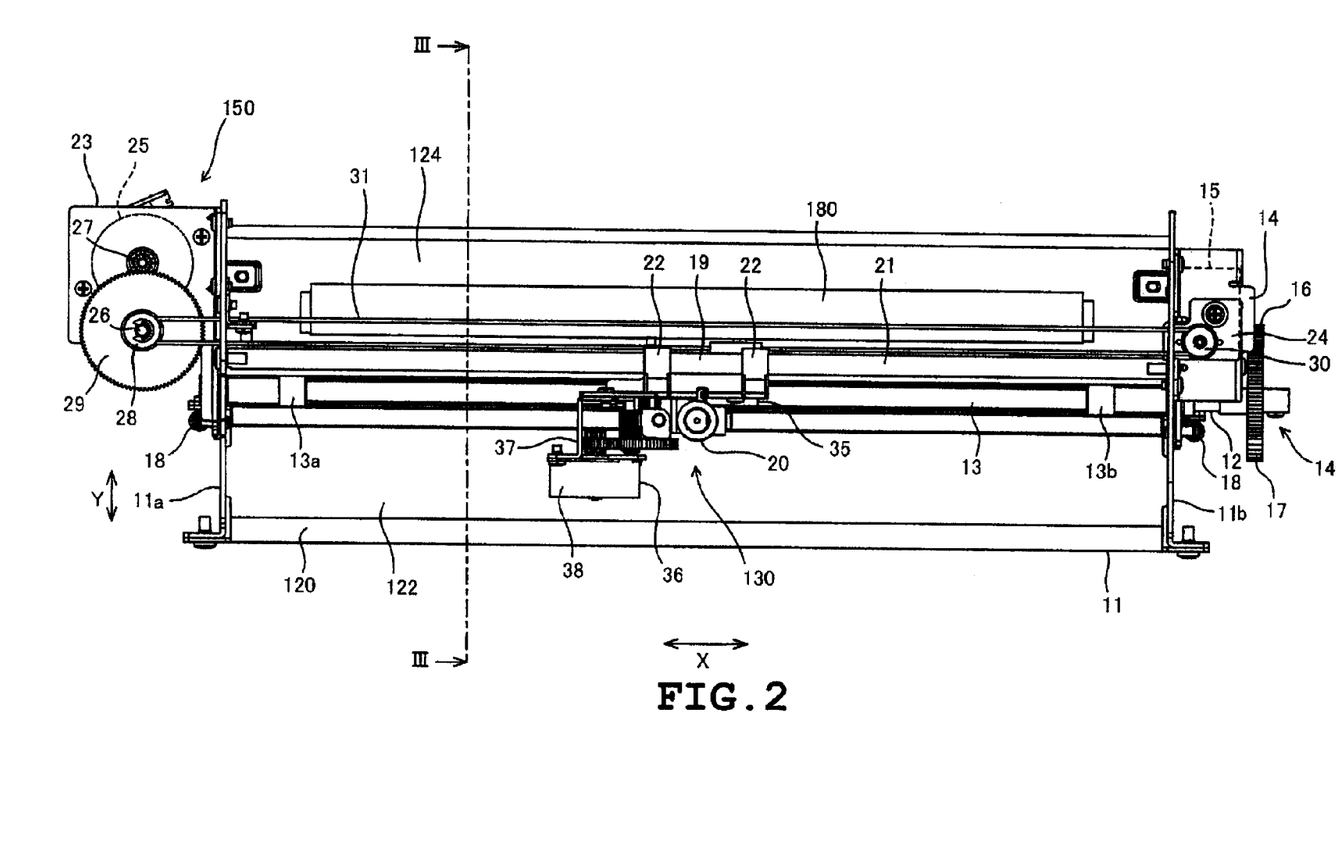
FIG. 2 is one example of a planar view of the internal structure of the cutting apparatus.
Figure 3:
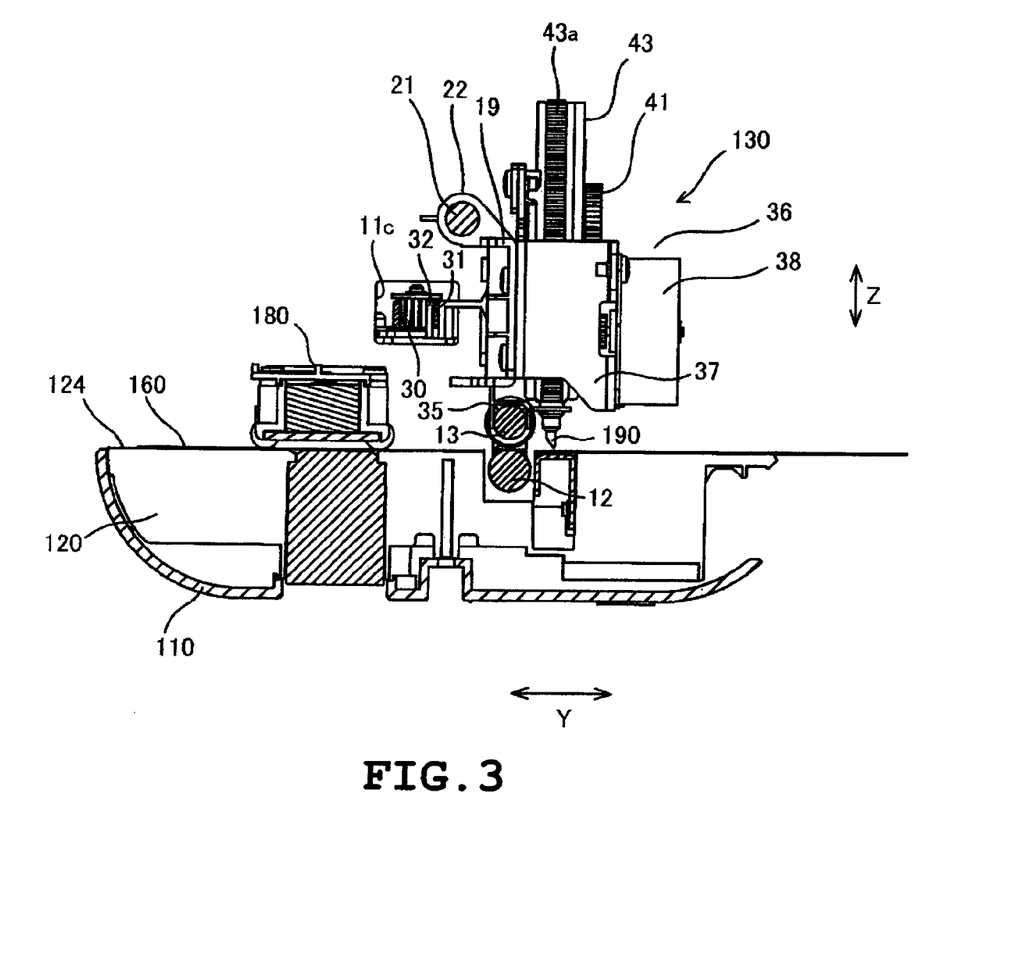
FIG. 3 is one example of a vertical left-side cross sectional view taken along line of FIG. 2.

Referring to FIGS. 1 to 3, a description will be given on the structure of the cutting apparatus 100 of the present embodiment. As only shown in FIG. 1, the cutting apparatus 100 is provided with the body 110 shaped like a laterally elongate rectangular box. As earlier described, the insert hole 111 extending in the left and right direction is formed on the front face of the body 110. The holding member 51 is inserted through the insert hole 111. Components such as a display 170 and control switches 172 are disposed on the front face of the body 110.

A machine frame 11 is provided inside the body 110. As shown in FIGS. 2 and 3, components such as the platen 120, the cut head 130, a feed mechanism 140, a cutter transfer mechanism 150, and the scanner 180 are disposed on the machine frame 11. The feed mechanism 140 transfers the holding member 51 in the front and rear direction. The cutter transfer mechanism 150 transfers the cut head 130 in the left and right direction.

In the present embodiment, forward and rearward direction in which the feed mechanism 140 is fed is defined as the Y direction. The left and right direction in which the cutter transfer mechanism 150 is transferred is defined as the X direction. The up and down direction orthogonal to the front and rear direction and the left and right direction is defined as the Z direction.

The platen 120 receives the underside of holding member 51 when cutting the workpiece 160. As can be seen from FIGS. 2 and 3, the platen 120 comprises a pair of a front platen 122 and a rear platen 124 being mounted on the machine frame 11. The upper surface of the platen 120 is level and the platen 120 is transferred with holding member 51 holding the workpiece 160 placed on top of it.

The feed mechanism 140 feeds the holding member 51 in the Y-direction across the upper surface of the platen 120 and is configured as described below. As shown in FIGS. 1 and 2, etc, the machine frame 11 is located inside the main cover 2. The machine frame 11 is provided with left and right sidewalls 11a and 11b that are located on the left and right sides of the platen 120 so as to face one another. As also shown in FIG. 3, a drive roller 12 and a pinch roller shaft 13 extending in the X direction across the left and right sidewalls 11a and 11b are provided so as to be located in the clearance between the forward platen 122 and the rear platen 124. The pinch roller shaft 13 and the drive roller 12 are aligned in the up and down direction such that the pinch roller shaft 13 is disposed above the drive roller 12.

The left and right end sides of the drive roller 12 are supported rotatably by the sidewalls 11a and 11b such that the upper end of the drive roller 12 is substantially coplanar with the upper surface of the platen 120. Referring to FIG. 2, the drive roller 12 extends rightward through the right sidewall 11b and on the right end of the drive roller 12, a follower gear 17 is provided which has a relatively large diameter. As further shown in FIG. 2, a mount frame 14 is attached on the outer surface of the right sidewall 11b and a Y-axis motor 15 is mounted on the mount frame 14. The Y-axis motor 15 comprises, for instance, a stepper motor. At the end of the rotary shaft of the Y-axis motor 15, a drive gear 16 is attached which has a relatively small diameter. The drive gear 16 is meshed with the aforementioned follower gear 17. Thus, the forward/reverse rotation of the Y-axis motor 15 drives the drive roller 12 in rotation in the forward and reverse directions.

The left and right ends of the pinch roller shaft 13 are supported rotatably by the left and right sidewalls 11a and 11b so as to be slightly movable in the direction of thickness of the workpiece 160. The pinch roller shaft 13 extends through both the left and the right sidewalls 11a and 11b, and between the left and right ends of the pinch roller shaft 13 and the outer surfaces of the corresponding sidewalls 11a and 11b, extension coil springs 18 are engaged to constantly bias the pinch roller shaft 13 downward toward the drive roller 12. Near the left and right side ends of the pinch roller shaft 13 as shown in FIGS. 1 and 2, roller portions 13a and 13b are provided that have diameters slightly larger than those of other portions of the pinch roller shaft 13.

Thus, left and right edges 212 and 214 of the holding member 51 are held between the drive roller 12 and the roller portions 13a and 13b of the pinch roller shaft 13. The feed mechanism 140 feeds the holding member 51 in the Y direction by the rotational drive of the drive roller 12 driven by the Y-axis motor 15 with the left and right edges of the holding member 51 held between the drive roller 12 and the roller portions 13a and 13b of the pinch roller shaft 13.

As can be seen from FIGS. 4 to 7 as well, the cut head 130 is provided with a carriage 19. As will be later described in detail, the cut head 130 is disposed on the front side of the carriage 19 with a cutter holder 20 and a vertical drive mechanism 36 situated on its left and right sides. The cut holder 20 holds the cutting member 50 attached to it. The vertical drive mechanism 36 moves the cutting member 50 in the up and down directions. On the rear side of the carriage 19, a mount portion 32 protruding rearward is provided as shown in FIG. 3.

The cutter transfer mechanism 150 transfers the cut head 130, in other words, the carriage 19 in the left and right direction crossing the direction in which the holding member 51 is fed and is configured as described below. Referring to FIGS. 1 to 3, a guide shaft 21 is disposed so as to extend in the left and right direction between the left and right sidewalls 11a and 11b of the machine frame 11 so as to be located slightly behind and above the pinch roller shaft 13. The guide shaft 21 extends substantially parallel with the pinch roller shaft 13, in other words, in the X direction.

Figure 8A:
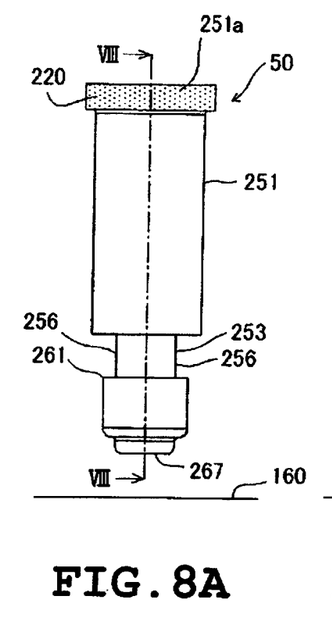
FIG. 8A is one example of a front view of a cutting member when a cut holder is in a lifted position.

Referring to FIG. 8, etc., the carriage 19 is configured substantially as a rectangular plate which is slightly laterally elongated in front view. On the upper edge of the carriage 19, the aforementioned guide sleeves 22 are provided so as to be located on the left and right side portions. The guide shaft 21 is inserted through the guide sleeves 22. Thus, the carriage 19 and consequently the cut head 130 are movable in the X direction along the guide shaft 21.

Referring to FIGS. 1 and 2, a horizontal mount plate 23 is attached to the outer rear side portion of the left sidewall 11a, whereas an auxiliary mount plate 24 is attached to the outer side of the right sidewall 11b. On the rear side of the mount plate 23, an X-axis motor 25 comprising a stepper motor for example, is mounted so as to be oriented upward. On the front side of the mount plate 23, a pulley shaft 26 extends rotatably in the direction orthogonal to the mount plate 23. The output shaft of the X-axis motor 25 is provided with a drive gear 27 having a relatively small diameter. The pulley shaft 26 is provided with a timing pulley 28 and a follower gear 29 having relatively large diameter. The timing pulley 28 and the follower gear 29 are structurally integral and thus, rotate integrally. The follower gear 29 meshes with the drive gear 27.

The auxiliary mount plate 24 is provided with timing pulley 30 arranged rotatably with its axis oriented upward. The timing pulley 30 and the timing pulley 28 are wound with an endless timing belt 31 which extends horizontally along the X direction. The intermediate portion of the timing belt 31 is connected to a mount portion 32 provided on the rear surface of the carriage 19 as can be seen in FIG. 3, etc. Sidewalls 11a and 11b are each provided with a square opening 11c to allow the timing belt 31 to pass through. Thus, the carriage 19 and consequently the cut head 130 is moved in the left and right direction by the rotation of the X-axis motor 25 in the forward and reverse directions which is transmitted to the timing belt 31 by way of the follower gear 29 and the pulley 28.

On the right side of the front face of the body 110, the display 170 and control switches 172 are provided as shown in FIG. 1. The display 170 comprises a full color liquid crystal display. The control switches 172 are controlled by the user for providing various instructions and making selections and inputs. The control switches 10 include a power button for turning the power ON/OFF and a start switch for executing the cutting operation. The switches 172 also include a touch panel provided on the surface of the display 170. Display 170 presents images of patterns and messages to be reported to the user. The user may select a given pattern from those presented on the display 170 and specify various parameters as well as input instructions through the operation of the control switches 172.

The scanner 180 reads the images on the surface of the holding member 51. The scanner 180 may comprise a CIS (contact image sensor). Though not shown in detail, the scanner 180 comprises components such as a line sensor configured by multiple imaging devices aligned in the X direction, a light source such as a lamp, and a lens. The scanner 180 is equipped with a contact glass on its under surface. As shown in FIGS. 2 and 3, the scanner 180 is located behind the guide shaft 21 and extends in the X direction so as to be substantially equal in length to the width of the holding member 51. The scanner faces downward and thus, the light source irradiates light downward of the scanner 180 through the contact glass.

Figure 10:
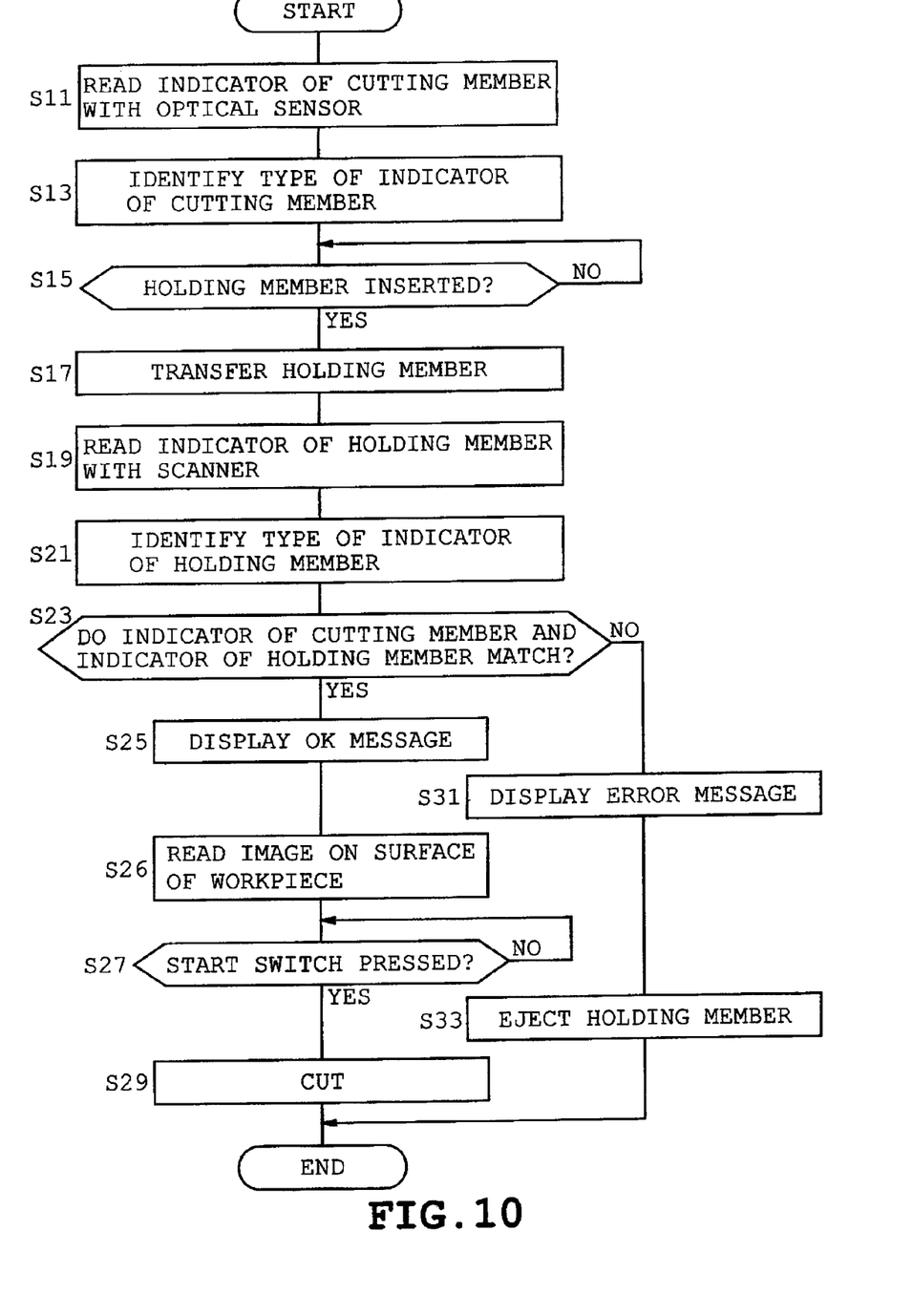
FIG. 10 is a flowchart indicating one example of a main process flow executed by a control circuit.

The scanner 180 reads the images on the workpiece placed on the platen 120 by positioning itself in the proximity of the upper surface of the workpiece. More specifically, the scanner 180 reads the images of the workpiece 160 held by holding member 51. The later described control circuit 61 detects the location and size of the workpiece 160 from the images read by the scanner 180 and outputs the same on the display 170. Further, as will be later described, the scanner 180 reads the images of the holding member indicator 210 of the holding member 51 in order to determine the type of the holding member 51. The scanner 180 is controlled by the control circuit 61 as shown in FIG. 10.

The cut head 130 will be described in detail with reference to FIGS. 4 to 7. As described above, the cut head 130 is provided with the cutter holder 20 on the right front side of the carriage 19 and the vertical drive mechanism 36 on the left side.

Figure 7:
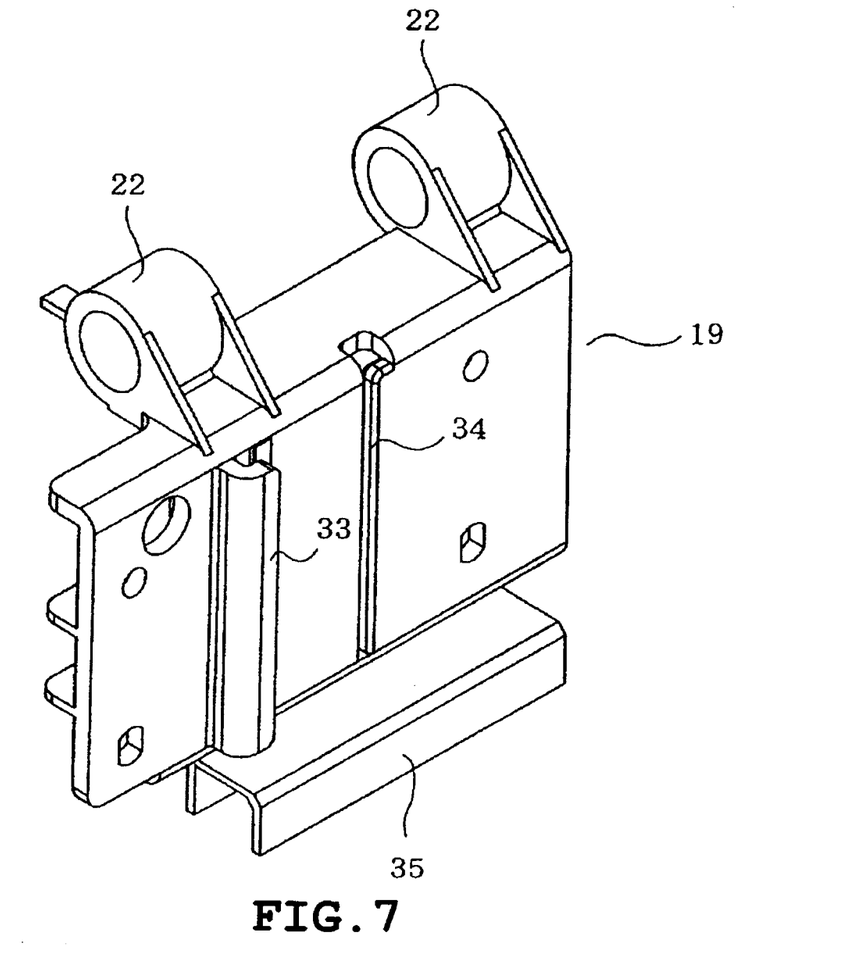
FIG. 7 is one example of a perspective view of a carriage.

As shown in FIG. 7, on the portion of the front face of the carriage 19, located slightly to the left, a first engagement portion 33 is provided which extends in the up and down direction. The first engagement portion 33 is L-shaped in plan view. On the central portion of the front face of the carriage 19, a second engagement portion 34 is provided which extends in the up and down direction. The first engagement portion 33 and the second engagement portion 34 are engaged with the later described cutter holder 20 such that the cutter holder 20 is slidable in the Z direction, which in this case, is the up and down direction. Further, on the lower end of the carriage 19, a slide contact portion 35 is provided for maintaining the orientation of the cut head 130, in other words, for inhibiting the pivoting of the cut head 130 about the guide shaft 21.

Referring to FIG. 3, etc. the slide contact portion 35 takes a downwardly oriented U-shape in side view. The slide contact portion 35 is made of a thin plate and extends in the left and right direction. As shown in FIG. 3, the inner surface of the slide contact portion 35 establishes sliding contact with the pinch roller shaft 13 to allow the X-directional movement of the carriage 19 while maintaining its orientation. Because the pinch roller shaft 13 is supported so as to be slightly movable in the up and down direction, in other words, the thickness direction of the workpiece 160, the slide contact portion 35 is in sliding contact with the pinch roller shaft 13 so as to be relatively movable in the up and down direction in which the pinch roller shaft 13 is moved. The slide contact portion 35 is formed into a shape that embraces the pinch roller shaft 13 from the front and rear direction which is the direction in which the workpiece 160 is fed. The slide contact portion 35 moves along the region located between the roller portions 13a and 13b of the pinch roller shaft 13. The movement of the slide contact portion 35 is arranged so as not to prevent the X-directional movement of the carriage 19, in other words, the cut head 130.

Figure 5:
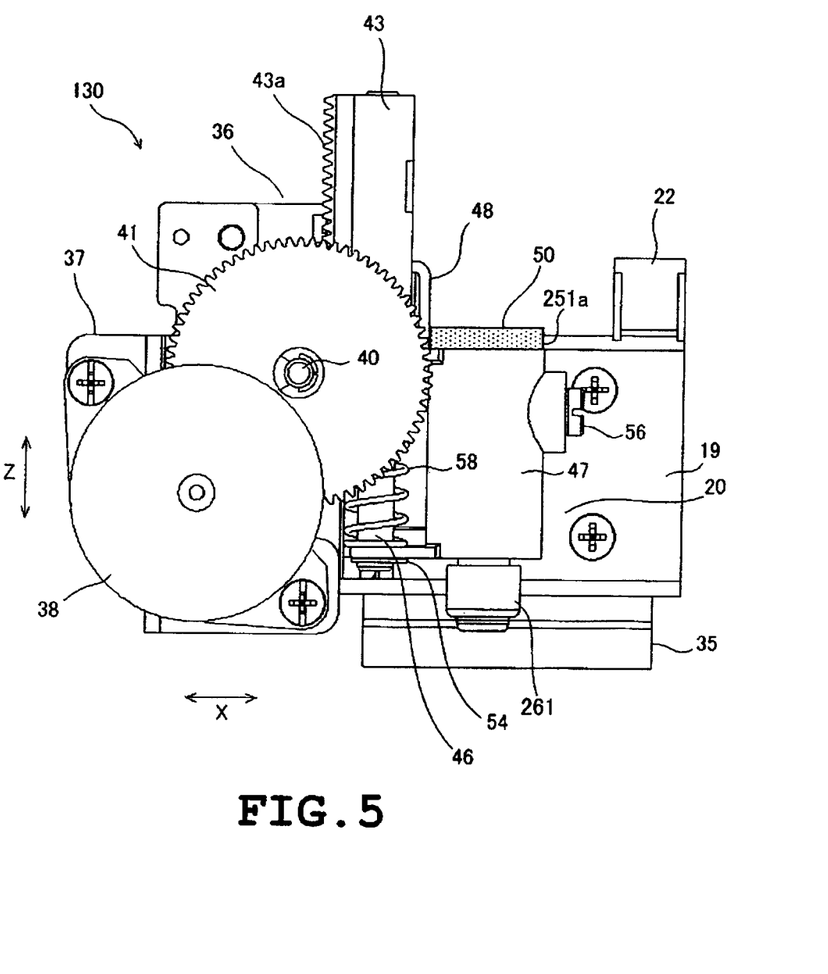
FIG. 5 is one example of a front view of the cut head.

The cutter holder 20 includes a mount sleeve 47, a first engagement subject 57, and a second engagement subject 49, and a shaft support 48 that are structurally integral. The cutter holder 20 is further provided with the optical sensor 200 shown in FIG. 6. The mount sleeve 47 extends in the up and down direction and is substantially cylindrical. As will be later described, the cutter member 50, provided with the cutter 190, is removably mounted, that is, interchangeably on the mount sleeve 47. As also shown in FIG. 5, the cutter member 50 is fitted with the mount sleeve 47 from the upward direction and fastened by a screw 56.

Figure 6:
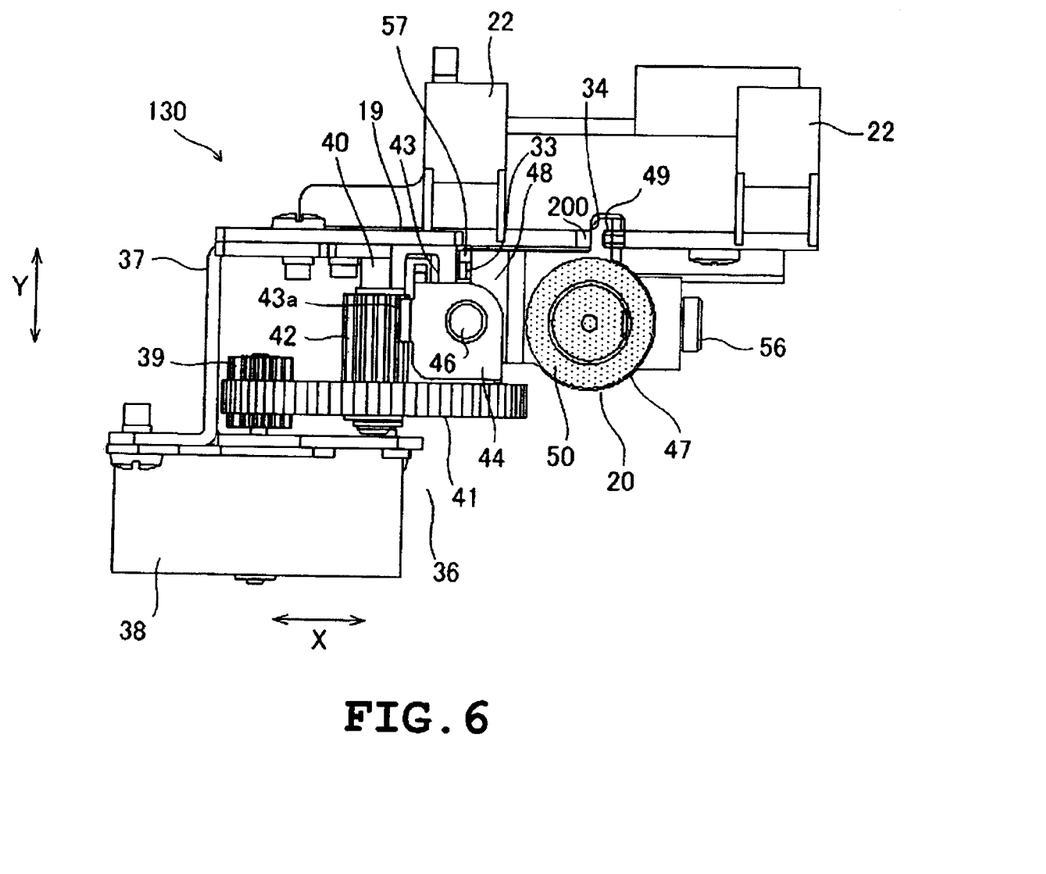
FIG. 6 is one example of a plan view of the cut head.

The first engagement subject 57 extends in the up and down direction and is located behind a later described shaft 46 as shown in FIG. 6. The first engagement subject 57 is engaged with the first engagement portion 33 of the carriage 19 so as to be movable in the up and down direction. The second engagement subject 49 is L-shaped in plan view as shown in FIG. 6 and extends in the up and down direction on the rear surface side of the mount sleeve 47. The second engagement subject 49 is engaged with the second engagement portion 34 of the carriage 19 so as to be movable in the up and down direction. Thus, the cutter holder 20 is supported by the carriage 19 so as to be movable in the up and down direction relative to the carriage 19. The cutter holder 20 is moved between the lowered position in which a later described tip 192 of the cutter 190 penetrates through the workpiece 160 and the lifted position in which the tip 192 is spaced apart from the workpiece 160 by a predetermined distance.

The shaft support 48 is located on the left side of the mount sleeve 47. A round and vertically elongate shaft 46 is mounted on the shaft support 48 so as to be located in the inner side of a later described rack member 43. The shaft 46 is mounted on the shaft support 48 by, but not limited to, being locked by a stop ring 80 provided on a lower end thereof. On the outer peripheral portion of the shaft 46, a compression coil spring 58 is wound.

Figure 4:
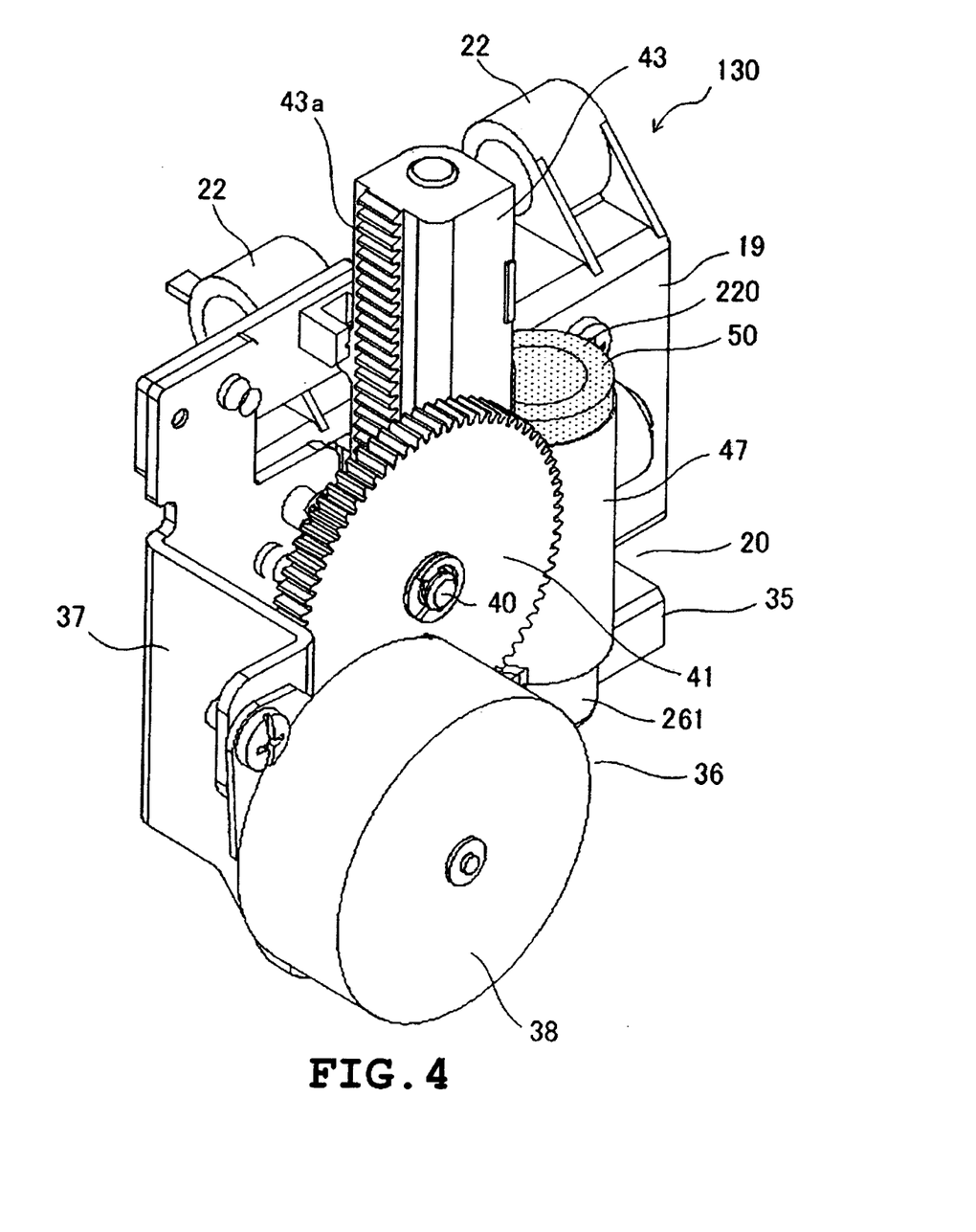
FIG. 4 is one example of a perspective view of a cut head.

The aforementioned vertical drive mechanism 36 is configured as described in the following. As shown in FIGS. 4 to 6, a mount plate 37 formed into a crank shape is provided on the left front side of the carriage 19. On the front face of the left end of the mount plate 37, a Z-axis motor 38, comprising a stepper motor for example, is provided so as to be oriented rearward. On the output shaft of the Z-axis motor 38, a drive gear 39 is attached which has a relatively small diameter. As shown in FIGS. 4 to 6, the mount plate 37 is provided with a forwardly protruding gear shaft 40 located rightwardly upward from the Z-axis motor 38. A follower gear 41 having a relatively large diameter and a pinion gear 42 are supported rotatably by the gear shaft 40. The follower gear 41 and the pinion gear 42 are structurally integral and thus, rotate integrally. The follower gear 41 meshes with the drive gear 39.

On the right side of the gear shaft 40, a rack member 43 is provided. The rack member 43 extends in the up and down direction and is shaped such that its left sidewall is adjoined with its front side wall. The rack member 43 is supported movably in the up and down direction by the shaft 46. The left side wall of the rack member 43 has a rack 43a, extending in the up and down direction, formed on it. The rack 43a meshes with the pinion gear 42 mentioned earlier. Thus, the rack member 43 is moved in the up and down direction by the rotation of the pinion gear 42 driven by the Z-axis motor 38.

Referring to FIG. 6, on the upper surface of the rack member 43, an upper support piece 44 is provided so as to be structurally integral with the upper surface of the rack member 43. The upper support piece 44 is shaped like a thin horizontal plate. On an inner portion of the rack member 43 located slightly below the vertical mid portion, an intermediate support piece not shown is provided. The intermediate support piece is also structurally integral with the rack member 43 and is shaped like a thin horizontal plate. Though not shown, the upper support piece 44 and the intermediate support piece each has a through hole formed through them. The shaft 46 is disposed in the up and down direction so as to extend through the through holes. Thus, the shaft support 48, in other words, the cutter holder 20 is lifted or lowered with the lifting and lowering of the rack member 43.

The lowering of the cutter holder 20 will be described in detail hereinafter. The cutter holder 20 is gradually lowered with the lowering of the rack member 43. The cut holder 20 stops its descent at the location where the tip 192 of the cutter 190 penetrates through the workpiece 160, whereas the rack member 43 alone continues its descent. The rack member 43 stops its descent after descending for a predetermined distance. Thus, in the lowered position of the cutter holder 20, the compression coil spring 58 is compressed by a predetermined distance below the intermediate support piece. As a result, the biasing force of the compression coil spring 58 exerts a predetermined pressure on the workpiece 160 applied through the cutter 190. The upward movement of the cutter holder 20 and consequently the cutter 190 against the biasing force of the compression coil spring 58 is also permitted.

The optical sensor 200 is provided on the left side of the second engagement subject 49 as shown in FIG. 6. The optical sensor 200 reads the color of the cutter indicator 220 of the later described cutter indicator 220.

[Structure of Cutting Member 50]

Next, referring to FIGS. 8A to 8C, the structure of the cutting member 50 of the present embodiment will be described in detail. The cutting member 50 cuts the workpiece 160 held by the holding member 51. The cutting member 50 is moved relative to the workpiece 160 by the feed mechanism 140, the cutter transfer mechanism 150, and the vertical drive mechanism 36. There are multiple types of cutting members 50 for multiple types of workpieces 160. Two types of workpieces 160, namely paper and cloth are provided in the present embodiment and thus, two types of cutting members 50 are provided, one for cutting paper and one for cutting cloth. The cutting members 50 for cutting paper and cloth differ in the type of cutter 190, for example, in the length of the blade 194, meaning that the amount of downward protrusion during the cutting motion differs. The two types of cutting members 50 are selectively attached to the mount sleeve 47 of the cutter holder 20.

The cutting member 50 is provided with the cutter 190, a cutter support portion 251, a fitting support member 253, and a presser member 261. The cutter support portion 251 rotatably supports the cutter 190 about the Z axis. The presser member 261 depresses the upper surface of the workpiece 160 when cutting the workpiece 160.

Figure 8B:
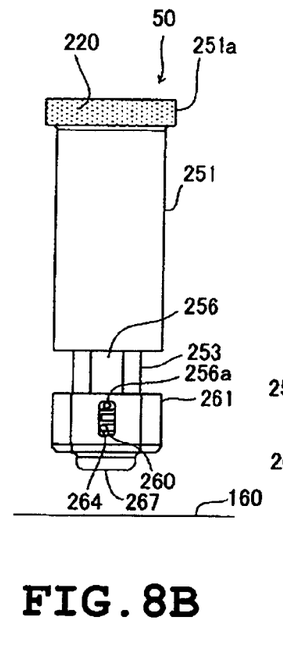
FIG. 8B is one example of a left side view of the cutting member.
Figure 8C:
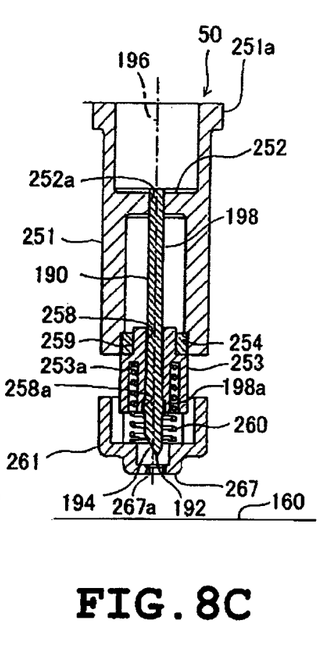
FIG. 8C is one example of a vertical left-side view of the cutting member taken along line VIII-VIII of FIG. 8A.

As shown in FIG. 8C, the cutter 190 is made of a metal material and is an integral structure comprising a vertically elongate and round cutter shaft 198 and the blade 194 provided at the end of the cutter shaft 198 for cutting the workpiece 160. A fitting protrusion 198a is provided on the lower portion of the cutter shaft 198. The blade 194 of the cutter 190 is angled with respect to the workpiece 160. The blade 194 has the tip 192 on its lowermost end which is eccentric by a predetermined distance form a central axis line 196 of the cutter shaft 198.

The cutter support portion 251 is made of synthetic resin material and is formed into a vertically elongate cylinder which is placed inside the mount sleeve 47. As shown in FIGS. 8A and 8B, a flange 251a is provided integrally on the upper end of the cutter support portion 251 which protrudes toward the outer peripheral side of the cutter support portion 251. As shown in FIGS. 4 and 5 the flange 251a serves as a handle to be held by the user's fingers when attaching the cutting member 50 to the cutter holder 20. The flange 251a is further configured to contact the upper end of mount sleeve 47 to ensure that the cutting member 50 is properly positioned in the vertical direction. Still further, a horizontal partition wall 252 is provided slightly above the vertical mid portion of the cutter support portion 251 interior as shown in FIG. 8C. In the central portion of the partition wall 252, a bearing hole 252a is provided to receive the upper end of the cutter shaft 198 of the cutter 190 and to allow the rotation of the cutter shaft 198.

As shown in FIGS. 8A, 8B, and further in FIGS. 4 to 6, the cutter indicator 220 is provided on the flange 251a of the cutter support portion 251. The cutter indicator 220 corresponds to the type of cutter 190, in other words, the type of a predetermined workpiece 160. The cutter indicator 220 is the same type of indicator as the holding member indicator 210 provided on a predetermined holding member 51 corresponding to a predetermined workpiece 160. In other words, when the type of workpiece 160 is paper, the color of the cutter indicator 220 provided on the cutting member 50 for cutting paper is cyan. When the type of workpiece 160 is cloth, the color of cutter indicator 220 provided on the cutting member 50 for cutting cloth is magenta. As described above, the carriage 19 is provided with the optical sensor 200 located near the flange 251a as shown in FIG. 6 for detecting the type of cutting member 50.

The fitting support member 253 is configured to support the cutter 190 and configured for attachment to the lower end of the cutter support portion 251.

As shown in FIGS. 8A to 8C, the fitting support member 253 is made of synthetic resin material and is shaped like a cylinder being smaller in diameter as compared to the cutter support portion 251. Among the outer peripheral surfaces of the fitting support member 253, the left and right potions as viewed in FIG. 8A are each formed into a flat surface 256 and thus, shaped like an oval in top view. Though only one side is shown in FIG. 8B, each of the flat surfaces 256 has a protrusion 256a formed on it which is shaped like a pin.

As shown in FIG. 8C, in the central portion of the fitting support member 253, an insert hole 258 is provided and the cutter shaft 198 is pressed through the insert hole 258. At the lower end of the insert hole 258, a fitting recess 258a is formed that corresponds to the fitting protrusion 198a of the cutter shaft 198. The cutter shaft 198 is pressed into the insert hole 258 of the fitting support member 253 until the fitting protrusion 198a and fitting recess 258a establish a fitting engagement. The cutter shaft 198 is thus, secured to the fitting support member 253. At this instance, each of the flat surfaces 256 of the fitting support member 253 is oriented so as to be parallel with the orientation of the blade 194.

On the outer peripheral portion of the upper end of the fitting support member 253, a stepped portion 259 is formed which has a smaller diameter compared to other portions of the fitting support member 253. The stepped portion 259 allows the fitting support member 253 to be rotatably coupled to the lower end of the cutter support portion 251 by way of the bearing member 254. Further, at the lower portion of the fitting support member 253, a ring-shaped spring receiving groove 253a is formed on the outer peripheral side of the insert hole 258. The spring receiving groove 253a is opened at the lower surface of the fitting support member 253 and receives the upper half portion of the compression coil spring 260.

The presser member 261 is made of a synthetic resin material and is formed into a shape of a cylindrical cap having an opened upper surface which is similar in size to the cutter support portion 251. Among the peripheral walls of the presser member 261, the left and right walls shown in FIG. 8A each have a vertically elongate long hole 264 formed on it. Though only one of the long holes 264 is shown in FIG. 8B, a protrusion 256a of the fitting support member 253 is disposed inside the long hole 264. Thus, the presser member 261 is allowed to move up and down with respect to the fitting support member 253 within the relatively movable range of the protrusion 256a within the long hole 264.

As shown in FIG. 8C, the bottom surface of the presser member 261 is structured so that the central portion of the bottom surface protrudes downward in a stepped manner. The under surface of the protruding surface serves as a flat contact portion 267 which contacts the upper surface of the workpiece 160 which is indicated by a line in each of FIGS. 8A to 8C. Further in the central portion of the bottom surface of the presser member 261, an insert hole 267a is formed through which the blade 194 of the cutter 190 moves in and out. Between the fitting support member 253 and the inner surface of the presser member 261, the compression coil spring 260 is provided to constantly bias the presser member 261 downward.

The cutting member 50 structured as described above is inserted into the mount sleeve 47 of the cutter holder 20 from the upward direction and fastened by a screw 56 as shown in FIGS. 4 to 6. Thus, the cutting member 50 and consequently the cutter 190 being supported by the cutter holder 20, is moved up and down by the vertical drive mechanism 36. When the cutting operation is not ongoing, the cutter 190 is located in the lifted position shown in FIGS. 8A to 8C and the blade 194 is not project downward to expose itself from the through hole 267a of the presser member 261.

When the cutter holder 20 and consequently the cutting member 50 is lowered by the vertical drive mechanism 36, the contact portion 267 located at the under side of the presser member 261 contacts the upper surface of the workpiece 160 to disallow further descent. Then, the cutter support portion 251 and consequently the cutter 190 is further lowered against the spring force of the compression coil spring 260 to the lowered position in which the blade 194 passes through hole 267a of the presser member 261 to penetrate through, in other words, cut the workpiece 160. Under such state, the holding member 51 is fed in the Y direction by the feed mechanism 140 while the cut head 130 is transferred in the X direction by the cutter transfer mechanism 150 to execute the cutting operation for cutting the workpiece 160.

[Electric Configuration of Cutting Apparatus 100]

Figure 9:
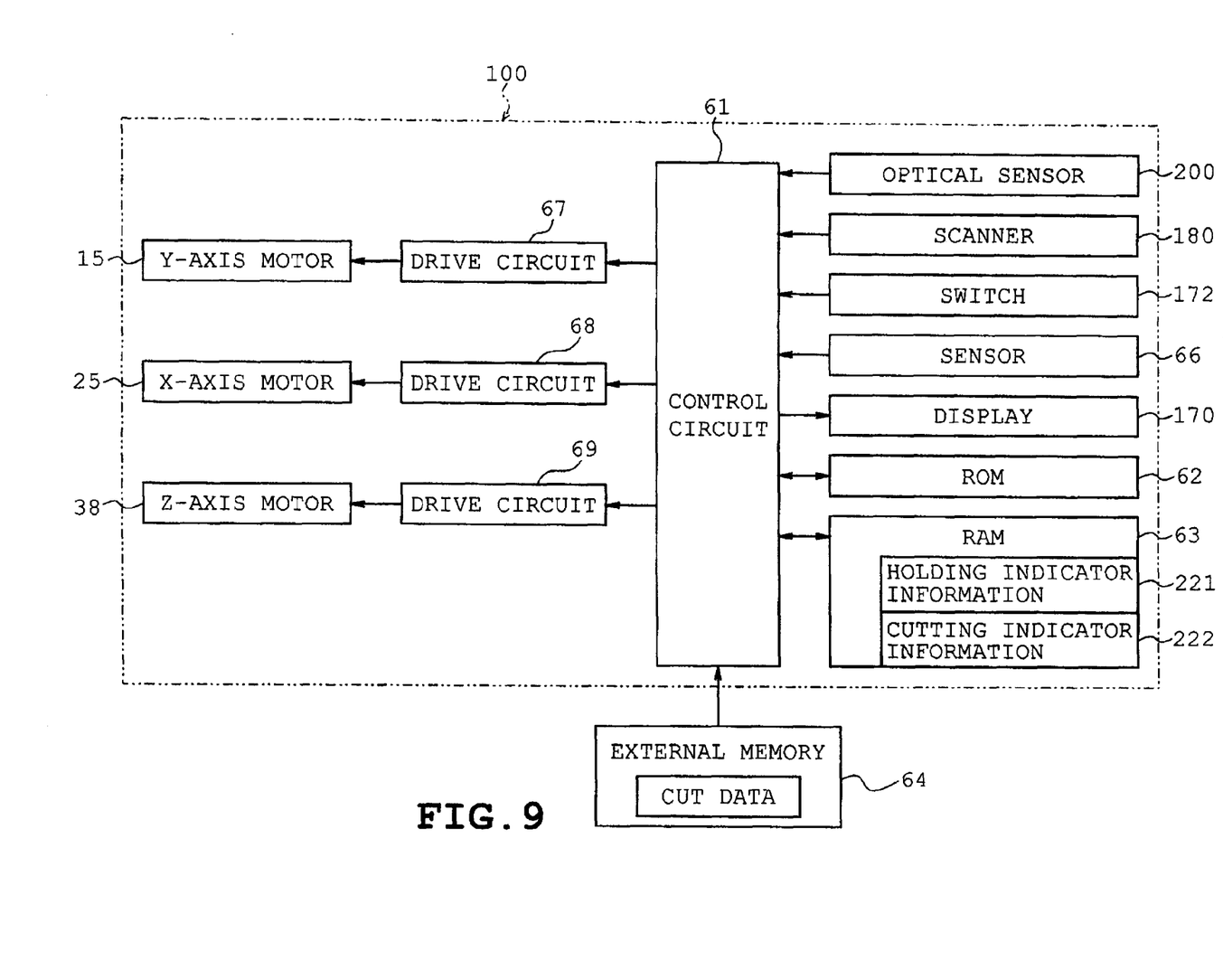
FIG. 9 is one example of a block diagram schematically illustrating an electric configuration.

Next, a control system of the cutting apparatus 100 will be described with reference to FIG. 9. The control circuit 61 is responsible for the overall control of the cutting apparatus 100 and is primarily configured by a computer comprising a CPU. The control circuit 61 is connected to a ROM 62, RAM 63, and external memory 64. The control unit 61 is further connected to the aforementioned optical sensor 200, scanner 180, control switches 72, sensor 66, and the display 170. The control circuit 61 is still further electrically connected to drive circuits 67, 68, and 69. The ROM 62 stores computer programs. Examples of such computer programs include a cut control program for controlling the cutting operation, cut data generating program, and a display control program for controlling the image output through the display 170. The RAM 63 is a temporary storage for storing data and programs required in executing various processes.

The scanner 180 transmits signals of read images to the control circuit 61. The control circuit 61 reads image information from the ROM 62 and transmits image signals to the display 170. The control switches 172 transmit control signals to the control circuit 61. The sensor 66 transmits detection signals to the control circuit 61. The detection signal is a signal that indicates the detection of the insertion of the holding member 51 into the insert hole 111. The optical sensor 200 reads the color information of the flange 251a and transmits the information to the control circuit 61.

The external memory 64 stores multiple entries of cut data. The cut data is used for cutting patterns from the workpiece 160. The cut data includes basic size information, cut line data, and display data. The basic size information represents the longitudinal and latitudinal sizes of a pattern and is a shape data corresponding to the shape of the pattern. The cut line data comprises coordinate data indicating the vertexes of line segments of the cut line data in X-Y coordinate system representation which is defined by the cutting apparatus 100.

The display 170 outputs various items such as a mode selection screen, a pattern selection screen, and a layout selection screen. The user may operate control switches 172, while viewing the display 170. The mode selection screen is a screen for selecting the functional mode. The pattern selection screen is a screen for pattern selection. The layout selection screen is a screen for specifying where to make the cut.

The drive circuits 67, 68, and 69 drive the Y-axis motor 15, the X-axis motor 25, and the Z-axis motor 38, respectively. The control circuit 61 controls components such as the Y-axis motor 15, the X-axis motor 25, and the Z-axis motor 38 through the execution of the cut control program and automatically executes the cutting of the workpiece 160 located on the holding member 51.

In the present embodiment, the control circuit 61 executes the following processes by its software configuration as will also be described in the flowchart description. When power is turned ON, the control circuit 61 detects whether the type of cutting member 50 attached to the cutter holder 20 is a paper cutting type or a cloth cutting type prior to the execution of the cutting operation. The detection is carried out by detecting the color of the cutter indicator 220 provided on the flange 251a of the cutting member 50 using the optical sensor 200.

Next, the control circuit 61, when detecting the insertion of the holding member 51 by the detection sensor 66, executes the image reading of the holding member indicator 210 of the holding member 51 by the scanner 180 and judges whether the type of the holding member 51 is a paper holding type or a cloth holding type based on the images of the holding member indicator 210 of the holding member 51 read by the scanner 180. Then, the control circuit 61 judges whether the detected types of the cutting member 50 and the holding member 51 correspond, in other words, match. The control circuit 61 displays the result of judgment to the display 170.

[Main Process]

Next, a description will be given on a main process executed by the control circuit 61 with reference to FIG. 10. The steps indicated by "S" in the flowchart of FIG. 10 represent the processes executed by the control circuit 61. The control circuit 61 is activated and executes the main process when the power is turned ON by the depression of the power switch which is one of the control switches 172.

At step S11, the control circuit 61 outputs a control signal to instruct reading of the cutter indicator 220 to the optical sensor 200. The optical sensor 200, upon receiving the control signal from the control circuit 61, reads the cutter indicator 220 of the cutting member 50. More specifically, the optical sensor 200 reads the cutter indicator 220 provided on the flange 251a of the cutting member 50.

At step S13, the control circuit 61 identifies the type of cutter indicator 220 provided on the cutting member 50. More specifically, the control circuit 61 specifies the type of the cutter indicator 220 of the cutting member 50 based on the color information of the flange 251a of the cutting member 50 read by the optical sensor 200. The control circuit 61 stores the type of cutter indicator 220 of the cutting member 50 as cutting indicator information 222 in the RAM 63. The cutting indicator information 222 may, for example, comprise an RGB value C2 (r2, g2, b2) that represent the color of the cutter indicator 220.

At step S15, the control circuit 61 judges whether or not the holding member 51 has been inserted into the insert hole 111. More specifically, the presence/absence of the holding member 51 is detected by the sensor 66 and the control circuit 61, when receiving a detection signal from the sensor 66 indicative of the presence of the holding member 51 (step S15: YES), proceeds to step S17. In the absence of the detection signal of the holding member 51 from the detector 66 (step S15: NO), step S15 is repeated.

At step S17, the control circuit 61 outputs a control signal to instruct the feeding of the holding member 51 by the feed mechanism 140. The feed mechanism 140 transfers the holding member 51 by a predetermined distance in response to a control signal given by the control circuit 61. The predetermined distance is a distance that the front edge 216 of the holding member 51, on which the holding member indicator 210 is provided, travels until reaching the location below a line sensor of the scanner 180. In operation, the Y-axis motor 15 is driven for a predetermined count of rotations by the drive circuit 67.

At step S19, the control circuit 61 outputs a control signal that instructs reading of the holding member indicator 210 to the scanner 180. The scanner 180, when receiving the control signal from the control circuit 61, reads the holding member indicator 210 of the holding member 51. The scanner 180 transmits signals of the read image of the front edge 216 of the holding member 51 to the control circuit 61.

At step S21, the control circuit 61 identifies the type of holding member indicator 210 provided on the holding member 51. More specifically, the control circuit 61 extracts the color information from the image signal of the holding member indicator 210 read by the scanner 180. The control circuit 61 specifies the type of the holding member indicator 210 of the holding member 51 based on the color information. The control circuit 61 stores the type of the holding member indicator 210 of the holding member 51 in the RAM 63 as holding indicator information 221. The holding indicator information 221 may, for example, comprise an RGB value C1 (r1, g1, b1) that represent the color of the holding member indicator 210.

At step S23, the control circuit 61 judges whether or not the cutter indicator 220 of the cutting member 50 and the holding member indicator 210 of the holding member 51 match. More specifically, the control circuit 61 reads the holding indicator information 221 and the cutting indicator information 222 stored in the RAM 63. The control circuit 61 judges whether the holding indicator information 221 and the cutting indicator information 222 match. When judging that the read holding indicator information 221 and the cutting indicator information 222 match (step S23: YES), the control circuit 61 proceeds to step S25. When judging that the read holding indicator information 221 and the cutting indicator information 222 do not match (step S23: NO), the control circuit 61 proceeds to step S31.

At step S25, the control circuit 61 reports to the user that the indicators were judged to match at step S23. More specifically, the control circuit 61 displays an OK message on the display 170. In more detail, the control circuit 61 reads image information of the OK message from the ROM 62 and transmits the image signal to the display 170. The OK message is a message conveying the permission to execute the cutting operation in response to the matching of the cutter indicator 220 of the cutting member 50 and the holding member indicator 210 of the holding member 51.

At step S26, control circuit 61 outputs a control signal for instructing the reading of images to the scanner 180. The scanner 180 reads the images on the surface of the workpiece 160 in response to the control signal given by the control circuit 61. More specifically, the reading by the scanner 180 is carried out in synchronism with the Y-directional movement of the holding member 51 holding the workpiece 160 toward the rear side of the platen 120 by the feed mechanism 140. The images on the surface of the workpiece 160 are thus, obtained. The scanner 180 transmits the image signals of the images read from the surface of the workpiece 160 to the control circuit 61. The control circuit 61 extracts information such as the outline and the graphic shapes of the pattern from the images read by the scanner 180 by known image processing methods. The control circuit 61 generates cut data based on the information such as the outline and graphic shapes of the patterns. The control circuit 61 writes the generated cut data into the RAM 63. At step S26, a known shading correction method may be applied to improve the quality of the image read by the scanner 180.

At step S27, the control circuit 61 judges whether or not the start switch, which is one of the switches 172, has been depressed. When determining that the start switch has been depressed (step S27: YES), the control circuit 61 proceeds to step S29. When determining that the start switch has not been depressed (step S27: NO), the control circuit 61 repeats step S27.

At step S29, the control circuit 61 outputs the control signal for instructing the cutting operation to drive signals 67, 68, and 69. As a result, the cutting apparatus 100 executes the cutting operation to the workpiece 160. More specifically, the cutting apparatus 100 transfers the cutting member 50 in the X direction by the cutter transfer mechanism 150 while feeding the holding member 51 holding the workpiece 160 in the Y direction by the feed mechanism 140 based on the cut line data. As a result, the workpiece 160 is cut along the outline of the pattern. More specifically, the drive circuits 67, 68, and 69 drive the Y-axis motor 15, the X-axis motor 25, and the Z-axis motor 38 in response to the control signals given by the control circuit 61 in order to cut the workpiece 160. After step S29, the control circuit 61 terminates the main process.

At step S31, the control circuit 61 reports to the user that the indicators were judged to unmatch at step S23. More specifically, the control circuit 61 displays an error message on the display 170. In more detail, the control circuit 61 reads image information of the error message from the ROM 62 and transmits the image signal to the display 170. The error message is a message conveying that the execution of the cutting operation is not permitted as the result of the unmatching of the cutter indicator 220 of the cutting member 50 and the holding member indicator 210 of the holding member 51.

At step S33, the control circuit 61 outputs a control signal to the drive circuit 67 to instruct ejecting of the holding member 51. The feed mechanism 140 ejects the holding member 51 by a predetermined distance in response to the control signal given by the control circuit 61. In more detail, the drive circuit 67 drives the Y-axis motor 15 for a predetermined count of rotations in order to eject the holding member 51. The control circuit 61 terminates the main process after completing step S33.

Advantages of the Present Embodiment

In the present embodiment, the holding member indicator 210 and the cutter indicator 220 of the same type which correspond to the type of the workpiece 160 are provided on the holding member 51 and the cutting member 50, respectively. Thus, it is possible for the user to readily be aware of the proper combination of the type of holding member 51 and the type of cutting member 50 that correspond to the workpiece 160 through visual recognition of the indicator.

In the present embodiment, the cutter indicator 220 is provided on the flange 251a of the cutter support portion 251. Thus, it is possible for the user to reliably see the cutter indicator 220 when holding the flange 251a for attachment of the cutting member 50 on the mount sleeve 47.

In the present embodiment, the holding member indicator 210 of the holding member 51 is provided on the surface of the base 52 which differ from the holding portion 53. Thus, it is possible for the user to reliably see the holding member indicator 210 even when the workpiece 160 is held by the holding portion 53.

In the present embodiment, a judgment is made as to whether or not the type of the holding member indicator 210 and the type of the cutter indicator 220 match at step S23. Further, the result of the judgment made at step S23 is reported through the display 170 at steps S25 and 31. Thus, the user is notified as to whether or not the type of cutting member 50 and the type of holding member 51 match without having to check the cutting member 50 and the holding member 51.

Modified Embodiments

The present disclosure is not limited to the embodiment described above but may be implemented in various other embodiments.

In the above described embodiment, the holding member indicator 210 and the cutter indicator 220 are identified by the same color. Alternatively, the holding member indicator 210 and the cutter indicator 220 may be identified by the same character, number, symbol or graphic. The holding member indicator 210 and the cutter indicator 220 will serve their purpose if the user is able to see that the indicators are of the same type. Examples of the same type of indicators include: the same type of characters, the same type of numbers, or the same type of symbols. Example of the same type of characters may be an upper case "A" and a lower case "a". Examples of the same type of numbers may be an Arabic numeral "3" and a Kanji (character set of Chinese origin) numeral "三". Examples of the same type of numbers may be "○" and "X".

In the above described embodiment, the control circuit 61 identified the type of cutting member 50 by reading the cutter indicator 220 at step S11. Further, at step S19, the type of the holding member 51 is identified by reading the holding member indicator 210. Alternatively, a workpiece identifier may be provided that identifies the type of workpiece 160 by, for example, directly reading the type of the workpiece 160 without reading the indicator. More specifically, the scanner 180 may read the surface of the workpiece 160 and identify the type of workpiece 160 by known pattern matching methods. Further, a cutting member identifier may be provided that identifies the type of the cutting member 50 by, for example, identifying the shape of the blade 194 of the cutting member 50. More specifically, the optical sensor 200 may read the shape of the blade 194 of the cutting member 50 and identify the type of the cutting member 50 by known pattern matching methods.

In the above described embodiment, a judgment is made at step S23 as to whether or not the type of the holding member indicator 210 and the cutter indicator 220 match and the result of the judgment is presented on the display 170 at steps S25 and S31. Alternatively, a mechanism for automatically permitting/inhibiting the cutting operation may be provided.

In the above described embodiment, the types of cutting member 50 and holding member 51 vary depending upon the material of the workpiece 160 such as paper and cloth. Alternatively, the types of cutting member 50 and holding member 51 may vary depending upon the thickness of the workpiece 160.

The above described program may be stored in a computer readable medium such as a hard disc, a flexible disc, a CD-ROM, or a DVD and be executed by a computer after being read from such medium. The program may be a transmission medium which can be distributed over a network such as the internet.

In the above described embodiment, a holding identifier that identifies the type of holder member indicator 210, a cutting identifier that identifies the type of cutter indicator 220, and a determiner that determines/judges whether or not the foregoing indicators match are implemented by a software executed by the control circuit 61. Alternatively, the foregoing elements may be implemented by hardware.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A cutting apparatus configured to cut a sheet of workpiece into a predetermined shape, comprising:

a body
a plurality of types of holding members configured to be set to the body with the workpiece removably held thereby, each type of holding member including:
a base being formed into a sheet as a whole, a holding portion disposed on a surface of the base and having a holding capacity suitable for a type of the workpiece to be held, and
a holding member indicator capable of distinguishing the plurality of types of holding members; a plurality of types of cutting members configured to be selectively attached to the body and configured to cut the workpiece held by the holding member, each type of cutting member including:
a cutter having a blade configured to cut the workpiece and having a cutting capacity suitable for a type of the workpiece to be cut,
a support portion supporting the cutter, and a cutter indicator provided on the plurality of types of cutting members and capable of distinguishing the plurality of types of cutting members, the cutter indicator being similar in configuration as the holding member indicator of a corresponding holding member; and
further comprising:
a first detecting unit detecting a type of holding member being set to the body,
a second detecting unit detecting a type of cutting member being attached to the body,
a reporting unit configured to report required information to a user, and
a control device configured to judge whether or not the type of holding member detected by the first detecting unit and the type of cutting member detected by the second detecting unit correspond to one another, and configured to perform a control to convey the judgment to the reporting unit.

2. The apparatus according to claim 1, wherein the cutter indicator of the cutting member is provided on the support portion.

3. The apparatus according to claim 2, wherein the support portion includes a handle configured to be held by a user and the cutter indicator is provided on the handle.

4. The apparatus according to claim 1, wherein the holding member indicator of the holding member is disposed on a portion of the surface of the base being different from the holding portion.

5. The apparatus according to claim 1, wherein the holding member indicator and the corresponding cutter indicator are colored in similar colors.

6. The apparatus according to claim 1, wherein the holding member indicator and the corresponding cutter indicator are configured by either of similar characters, similar numbers, similar symbols, or similar graphics.

7. The apparatus according to claim 1, wherein the holding portion comprises an adhesive layer configured to allow removable adhesion of the workpiece and having adhesion capacity suitable for a type of the workpiece.

8. The apparatus according to claim 1, wherein the first detecting unit detects the type of holding member by detecting the holding member indicator provided on the holding member, and the second detecting unit detects the type of cutting member by detecting the cutter indicator provided on the cutting member.

9. The apparatus according to claim 1, wherein the first detecting unit comprises a scanner that reads an image of a surface of the holding member.

* * * * *